(12) United States Patent
Beihoffer et al.

(10) Patent No.: US 10,012,079 B2
(45) Date of Patent: *Jul. 3, 2018

(54) SELF HEALING SALT WATER BARRIER (75) Inventors: Thomas W. Beihoffer, Arlington Heights, IL (US); Nataliya V. Larionova, Evanston, IL (US); Marek R. Mosiewicz, Chicago, IL (US)

(73) Assignee: AMCOL INTERNATIONAL CORPORATION, Hoffman Estates, IL (US)

( * ) Notice: Subject to any disclaimer, the term of this patent is extended or adjusted under 35 U.S.C. 154(b) by 1842 days.

This patent is subject to a terminal disclaimer.

(21) Appl. No.: 11/942,638

(22) Filed: Nov. 19, 2007

(65) Prior Publication Data
US 2009/0130368 A1 May 21, 2009

(51) Int. Cl.
*E21D 11/38* (2006.01)
*B32B 27/12* (2006.01)
(Continued)

(52) U.S. Cl.
CPC .......... *E21D 11/383* (2013.01); *B32B 3/02* (2013.01); *B32B 5/022* (2013.01); *B32B 5/024* (2013.01);
(Continued)

(58) Field of Classification Search
USPC ............ 405/128, 36, 129, 43, 46, 50, 229; 210/501, 764, 747, 170.03, 254, 265,
(Continued)

(56) References Cited

U.S. PATENT DOCUMENTS 3,949,560 A 4/1976 Clem
3,986,365 A 10/1976 Hughes
(Continued)

FOREIGN PATENT DOCUMENTS

DE 3704503 8/1988
EP 450924 A2 * 10/1991
(Continued)

OTHER PUBLICATIONS http://drake.marin.k12.ca.us/stuwork/rockwater.html. Components and Salinity of Sea Water, 2010, pp. 1-4.*
(Continued)

*Primary Examiner* — Chinessa T. Golden
(74) *Attorney, Agent, or Firm* — Marshall, Gerstein & Borun LLP (57) ABSTRACT

Geocomposite articles that can provide a barrier against high conductivity water e.g., ocean water, are described and their method of manufacture, for waterproofing surfaces that contact high conductivity water. The geocomposite article mat includes a woven or non-woven geotextile sheet or mat containing a powdered or granular partially cross-linked acrylamide/acrylate/acrylic acid copolymer across its entire major surface(s). The powdered or granular copolymer has an unexpectedly high free-swell when hydrated with High Conductivity water, such as ocean water. A liquid-impermeable cover sheet is adhered to the upper major surfaces of the filled copolymer-carrying geotextile to provide a primary high conductivity water barrier layer that, if ruptured, is sealed by the swell of an underlying layer of water-insoluble, partially cross-linked acrylamide/acrylic acid copolymer.

36 Claims, 7 Drawing Sheets

(51) Int. Cl.
   *E02D 31/00* (2006.01)
   *B32B 5/02* (2006.01)
   *B32B 7/04* (2006.01)
   *B32B 7/08* (2006.01)
   *B32B 7/12* (2006.01)
   *B32B 27/14* (2006.01)
   *B32B 27/30* (2006.01)
   *B32B 3/02* (2006.01)

(52) U.S. Cl.
   CPC ............... *B32B 7/045* (2013.01); *B32B 7/08* (2013.01); *B32B 7/12* (2013.01); *B32B 27/12* (2013.01); *B32B 27/14* (2013.01); *B32B 27/304* (2013.01); *E02D 31/004* (2013.01); B32B 2255/02 (2013.01); B32B 2262/0246 (2013.01); B32B 2262/0253 (2013.01); B32B 2262/0261 (2013.01); B32B 2262/0276 (2013.01); B32B 2262/0292 (2013.01); B32B 2262/04 (2013.01); B32B 2262/101 (2013.01); B32B 2262/105 (2013.01); B32B 2307/714 (2013.01); B32B 2307/7145 (2013.01); B32B 2307/726 (2013.01); B32B 2307/728 (2013.01); B32B 2307/7265 (2013.01); B32B 2307/762 (2013.01); B32B 2419/00 (2013.01); B32B 2581/00 (2013.01); B32B 2607/00 (2013.01); *Y10T 156/10* (2015.01); *Y10T 428/23* (2015.01); *Y10T 428/24942* (2015.01); *Y10T 442/30* (2015.04); *Y10T 442/60* (2015.04)

(58) Field of Classification Search
   USPC ....... 210/532.1, 679, 170; 442/63, 320, 324, 442/326, 148, 286, 394, 86; 524/547; 156/60, 308.2, 334, 73.1, 73.6; 428/86, 428/91, 99, 68, 212, 220, 41.8, 912
   See application file for complete search history.

(56) References Cited

U.S. PATENT DOCUMENTS

| | | | |
|---|---|---|---|
| 4,021,402 A | 5/1977 | Clem | |
| 4,048,373 A | 9/1977 | Clem | |
| 4,103,499 A * | 8/1978 | Clem | 405/229 |
| 4,202,413 A | 5/1980 | Messenger | |
| 4,344,722 A | 8/1982 | Blais et al. | |
| 4,467,015 A | 8/1984 | Clem | |
| 4,501,788 A | 2/1985 | Clem | |
| 4,534,926 A | 8/1985 | Harriett | |
| 4,565,468 A | 1/1986 | Crawford | |
| 4,634,538 A | 1/1987 | Alexander | |
| 4,656,062 A | 4/1987 | Harriett | |
| 4,693,923 A | 9/1987 | McGroarty et al. | |
| 4,787,780 A | 11/1988 | Harriett | |
| 4,872,911 A * | 10/1989 | Walley et al. | 106/33 |
| 5,132,021 A * | 7/1992 | Alexander | 210/679 |
| 5,149,750 A * | 9/1992 | Niessner et al. | 526/81 |
| 5,171,781 A * | 12/1992 | Farrar et al. | 524/547 |
| 5,237,945 A * | 8/1993 | White | 112/420 |
| 5,317,834 A | 6/1994 | Anderson | |
| 5,389,166 A * | 2/1995 | White | 156/71 |
| 5,501,753 A * | 3/1996 | Stark | 156/70 |
| 5,578,219 A | 11/1996 | Kajita | |
| 5,679,364 A | 10/1997 | Levy | |
| 5,811,531 A * | 9/1998 | Iguchi et al. | 536/1.11 |
| 6,610,780 B1 | 8/2003 | Payzant et al. | |
| 6,737,472 B2 * | 5/2004 | Zhou et al. | 524/789 |
| 6,783,802 B2 | 8/2004 | Darlington, Jr. et al. | |
| 6,802,672 B2 * | 10/2004 | Hardin et al. | 405/129.65 |
| 6,852,813 B2 * | 2/2005 | Darlington et al. | 526/223 |
| 2005/0103707 A1* | 5/2005 | Olsta et al. | 210/502.1 |
| 2007/0044528 A1 | 3/2007 | Kitchen | |
| 2011/0177736 A1 | 7/2011 | Donovan et al. | |
| 2014/0302735 A1 | 10/2014 | Donovan et al. | |

FOREIGN PATENT DOCUMENTS

| | | |
|---|---|---|
| EP | 1233032 A1 * | 8/2002 |
| EP | 1426402 A2 * | 6/2004 |
| GB | 1029513 | 5/1966 |
| GB | 1059363 | 2/1967 |
| GB | 1129840 | 10/1968 |
| GB | 2202185 | 9/1988 |
| WO | WO 9715367 A1 * | 5/1997 |
| WO | WO-00/73596 A1 | 12/2000 |
| WO | WO-2004/016425 A2 | 2/2004 |

OTHER PUBLICATIONS

U.S. Fish and Wildlife Service. Refuge Habitats. http://www.fws.gov/refuge/Don_Edwards_San_Francisco_Bay/habitat.html. 2013.*

European Search Report for corresponding European Application No. 12162611.3, dated May 3, 2013.

International Search Report and Written Opinion, International Application No. PCT/US2008/075162 (dated Dec. 12, 2008).

International Preliminary Report on Patentability, International Application No. PCT/US2008/075162, dated Nov. 5, 2009.

\* cited by examiner

Figure 5A: Prototype Sample – Side View

Figure 5B: Prototype Sample with 1-inch slit – Tope View

FIG. 6

Test of Prototype in Seawater (53.2 mS) with 20 lb/ft² Confining Pressure PVC Membrane/SAP/Nonwoven

Figure 7

SELF HEALING SALT WATER BARRIER

FIELD OF THE INVENTION

The present invention is directed to methods and articles of manufacture useful as waterproofing membranes for waterproofing surfaces against the penetration of high conductivity salt-containing water, e.g., bay water, groundwater, marsh water, brackish water, ocean water, mining waste water, such as in the formation of waterproofed construction areas subjected to contact with high conductivity waters such as lagoons, hazardous or toxic waste containment areas, subterranean foundation surfaces and the like. More particularly, the present invention is directed to salt-water waterproofing articles of manufacture formed by confining a partially cross-linked polyacrylamide/partially neutralized polyacrylic acid copolymer in a mat. Alternatively, the copolymer can be forced into the non-woven fabric mat after formation of the mat or produced directly in the structure via polymerization or other processes.

BACKGROUND OF THE INVENTION AND PRIOR ART

Various polymers, swellable clays, and multi-layer articles of manufacture have been applied to the surface of soil to provide a waterproofing layer to prevent the penetration of water and/or hazardous or toxic materials into the earth, and to provide lagoons, ponds and other water-containment areas. Water-swellable clays, such as bentonite, have been applied directly to the soil surface and impacted in place, as disclosed in this assignee's prior U.S. Pat. No. 3,986,365. In addition, many different multi-layered articles of manufacture containing a water-swellable clay, such as sodium bentonite, have been manufactured by securing the water-swellable clay to major interior surfaces of flexible sheet materials, e.g., Clem U.S. Pat. No. 4,501,788, for application to the soil surface in abutting or overlapping relation to adjoining multi-layered articles. Examples of other flexible sheet materials containing adhesively secured water-swellable clays are found in the following U.S. Pat. No. Clem 4,467,015; McGroarty, et al. U.S. Pat. No. 4,693,923; Harriett U.S. Pat. No. 4,656,062; and Harriett U.S. Pat. No. 4,787,780.

U.K. published Patent Application GB 2,202,185A discloses a layer of water-swellable bentonite between flexible fabric layers that have been needle punched together in a needle loom that secures the upper and lower layers together, wherein at least one of the fabric layers is a non-woven textile material.

Another waterproofing barrier, disclosed in Blais U.S. Pat. No. 4,344,722, is constructed in the field by applying a first flexible, water-permeable fabric layer, overlaying a thickness of water-swellable clay material and applying an overlay of the same flexible, water-permeable fabric thereover. Other patents disclosing the use of water barrier layers for protecting a soil surface include British Patent Specification 1,059,363; British Patent Specification 1,029,513 and British Patent Specification 1,129,840.

German Patent DE 37 04 503 C2 discloses an article having two fabric layers including one non-woven fabric, surrounding a bentonite clay layer wherein the two fabric layers are needle punched together. Crawford U.S. Pat. No. 4,565,468 discloses an article including two fabric layers surrounding a bentonite clay layer wherein the two fabric layers are quilted together in a pattern forming four sided compartments.

While the articles described in the above-mentioned patents are effective for waterproofing against the penetration of relatively non-contaminated water, they are unable to prevent the penetration of salt (e.g., NaCl) containing water, such as ocean water. This assignee's U.S. Pat. No. 5,389,166, hereby incorporated by reference, describes incorporating a water swellable clay into a mat while laying down fiber to form the mat.

Surprisingly it has been found that a partially cross-linked copolymer of acrylamide/partially neutralized polyacrylic acid, preferably acrylamide/potassium acrylate or sodium acrylate/acrylic acid copolymer (CAS# 312-12-13-2), e.g., STOCKOSORB, or STOCKOSORB S, from Stockhausen, Inc. of Greensboro, N.C., will waterproof surfaces against the penetration of high conductivity water. The articles described herein are most useful to provide a water barrier against multivalent ion-containing water having a conductivity of at least 1 mS/cm, preferably at least 10 mS/cm, more preferably at least 30 mS/cm, even more preferably at least 40 mS/cm, and most preferably at least 50 mS/cm.

Super absorbent polymers ("SAPs") have been produced since the 1970s for use in a variety of products including, amongst others, hygiene products, such as disposable diapers, training pants, feminine hygiene products and incontinence devices, agricultural and horticultural products and industrial and environmental absorbents. SAPs are primarily utilized to increase or enhance the product's water-absorbency.

SAPs are produced from a variety of components by a variety of processes. For example, SAPs are often made from monomers such as acrylamide, acrylic acid and acrylate, which are particularly suitable for application in hygiene products.

Alternately, swelling clays, such as sodium smectite clays, e.g., sodium bentonite may be used to provide water-absorbency to a product. With respect to cost, the cost of swelling clays tends to be minimal compared to that of the chemical monomers described above. In addition, swelling clays are relatively stable compared to chemical monomers and are not as subject to degradation. However, swelling clays have a water absorption capacity significantly less than that of SAP, and like the common partially cross-linked partially neutralized acrylic acid copolymer SAPs, sodium smectites do not have sufficient free-swell when contacted by high conductivity salt water to act as a salt water barrier.

Some products include both an SAP and a swelling clay, as described in U.S. Pat. No. 6,610,780 and this assignee's U.S. Pat. No. 6,783,802, hereby incorporated by reference. Neither the SAPs nor the water-swellable clays, however, have been capable of waterproofing surfaces against the penetration of high conductivity ion-contaminated water, such as ocean water.

It is well known that the montmorillonite group of clays hydrate and swell in fresh water but the swelling is substantially inhibited in salt contaminated water. Salt contaminated water is often encountered in the environments of use of bentonite clays where bentonite is advantageously employed for its swelling capacity, for example, as an additive in drilling muds for the purpose of sealing fissures in earthen formations surrounding the drill hole to prevent loss of drilling fluid; and in the sealing of lagoons and landfills. When contacted with salt contaminated water, the swelling capacity and stability of common montmorillonite clays are severely inhibited making it necessary to use much greater quantities of the clay to achieve the degree of swelling needed for sealing purposes. In some cases the palygorskite clays are used instead of the montmorillonite clays because of their better dispersing properties in salt water, as disclosed in U.S. Pat. No. 4,202,413.

In the past, modified bentonite clays have been developed by this assignee having a swelling capacity substantially less inhibited in salt water. Examples of such modified bentonites are the polymer treated bentonites disclosed in the Clem U.S. Pat. Nos. 3,949,560; 4,021,402; 4,048,373 and 4,103,499.

The assignee's U.S. Pat. No. 4,634,538 teaches that one or more gums, such as xanthan gum, can be added to a water-swellable clay to improve its free swell when hydrated with salt-contaminated water. This assignee's U.S. Pat. No. 5,578,219 describes impregnating a dried, water-swellable clay with an aqueous solution of a water-soluble polymer followed by re-drying to improve the ability of the clay to absorb contaminated water.

Partially cross-linked acrylamide/sodium or potassium acrylate/acrylic acid copolymers have been used for retention of water and plant nutrients in agriculture by mixing the copolymers in soil for contact with, and as a water and nutrient source for, plants roots, but have not been recognized to provide sufficient free swell when in contact with salt-contaminated (high conductivity) water for purposes of waterproofing salt-contaminated water-contacting surfaces, as described in U.S. Patent Publication No. 2007-0044528-A1 and U.S. Pat. No. 5,317,834.

SUMMARY

The articles and methods described herein are based on the discovery that agricultural grade superabsorbent polymers partially cross-linked (water insoluble) copolymers of acrylamide/partially neutralized acrylic acid, particularly potassium and/or sodium acrylate, have exceptional and unexpected free swell when in contact with high conductivity water or multivalent ion-containing-contaminated water The articles of manufacture described herein all include a partially cross-linked acrylamide/acrylate/acrylic acid copolymer and are used for waterproofing against high conductivity salt-containing water. More particularly, the partially cross-linked acrylamide/acrylate/acrylic acid copolymers, described herein, in accordance with a preferred embodiment of the present invention, are incorporated into sheet or roll form as waterproofing geotextile articles; or are incorporated into deformable, putty-like consistency articles for waterproofing concrete joints and the like (see U.S. Pat. No. 4,534,926, hereby incorporated by reference) by substituting the agricultural grade SAPs described herein for the bentonite clay of the U.S. Pat. No. 4,534,926 patent. The sheet or roll form geotextile articles of manufacture described herein are self-healing (will seal cuts, cracks and fissures caused in adjacent water barrier sheets or films during or after installation) and are particularly effective in sealing seems between two water barrier substrates, e.g., concrete sections and between adjacent, geocomposite liners in contact with high conductivity salt water.

In a preferred embodiment, geocomposite articles that contain the partially cross-linked acrylamide/acrylate/acrylic acid copolymers are included as a safety layer under a separate, water barrier sheet material or membrane layer.

Accordingly, one aspect of the articles and method described herein is to provide an acrylamide/acrylate/acrylic acid copolymer that has sufficient free swell when in contact with high conductivity water such that the copolymer can provide a barrier to seal against penetration of the contaminated water.

Another aspect of the articles and methods described herein is to provide multi-layer geocomposite articles including a polymeric barrier layer, a woven or non-woven layer, and an intermediate layer of a partially cross-linked acrylamide/acrylate/acrylic acid copolymer that has sufficient free-swell when contacted by high conductivity water such that if a crack or rupture occurs in the polymeric barrier layer, the confined copolymer will swell sufficiently upon salt water contact to fill the crack or rupture to heal the crack or rupture and prevent further salt water leakage.

The above and other aspects and advantages will become apparent from the following detailed description taken in conjunction with the drawings.

DETAILED DESCRIPTION OF THE PREFERRED EMBODIMENTS

The present invention may be understood more readily by reference to the following detailed description of the invention and the examples provided therein. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Conductivity is a measure of the level of ion concentration of a solution. The more salts, acids or bases are dissociated, the greater the conductivity of the solution. In water or wastewater it is mainly a matter of the ions of dissolved salts, and consequently the conductivity is an index of the salt load in wastewater. The measurement of conductivity is generally expressed in S/cm (or mS/cm) which is the product of the conductance of the test solution and the geometric factor of the measuring cell. For purposes of this invention, high conductivity waters are defined as waters with conductivity greater than 1 mS/cm. Conductivity can be measured using a variety of commercially available test instruments such as the Waterproof PC 300 handheld meter made by Eutech Instruments/Oakton Instruments.

In the preferred embodiment, the partially cross-linked acrylamide/acrylate/acrylic acid copolymer is incorporated as a layer between a water barrier sheet or film barrier layer, preferably a polymer sheet material or membrane layer, and a woven or non-woven geotextile sheet material fabric layer. The polymer sheet material layer would be disposed in contact with the high conductivity water and the copolymer is disposed adjacent to the polymer sheet material layer between the membrane and the fabric layers to perform the function of a safety layer to prevent the flow of high conductivity water through the article if the polymer sheet material layer is defective or develops a crack or hole during installation or during use. Alternatively, the copolymer can be incorporated into the intersticies of the geotextile fabric layer to create a fabric/copolymer composite layer that serves as the safety layer attached to the membrane layer to prevent the flow of high conductivity water through the article if the polymer sheet material layer is defective or develops a crack or hole during installation or during use.

The partially cross-linked acrylamide/partially neutralized acrylic acid copolymers, e.g., STOCKOSORB™ and/or STOCKOSORB S™, have been found to have substantial free swell when contacted by high conductivity solutions. Examples of tested high conductivity aqueous solutions are 1% NaCl (conductivity of 18 mS/cm) and synthetic seawater (4.5% sea salt; conductivity of 53.2 mS/cm). The partially cross-linked acrylamide/partially neutralized acrylic acid copolymers provide substantial free swells when in contact with aqueous solutions contaminated with any, or a combination of, $Na^+$, $Ca^{++}$, $Mg^+$, $Al^{+++}$ and other multivalent cations in combination with anions that are common in sea water and other wastewaters. To achieve the full advantage of the geocomposite articles and methods described herein, the partially cross-linked acrylamide/acrylate/acrylic acid copolymers used in the geocomposite articles should have a free swell in 4.5% salt water of at least 35 ml per 2 grams of copolymer, preferably at least about 40 ml/2 grams, more preferably at least about 50 ml/2 grams. Free swells are determined by sprinkling 2 grams of powdered copolymer into a 100 ml graduated cylinder and filling the cylinder to 100 ml with 4.5% salt water. The volume of copolymer that settles to the bottom of the graduated cylinder is then measured and is the free swell.

In the preferred embodiment, described herein are multilayer articles of manufacture that are salt water barrier geocomposite mats, and their method of manufacture. In the preferred embodiment, the geocomposite mat includes a pre-formed woven or non-woven geotextile fabric material, having a thickness of about 0.5 mm to about 200 mm, preferably about 1 mm to about 100 mm, having a layer of powdered or granular partially cross-linked acrylamide/partially neutralized acrylic acid copolymer, either in at least an upper portion of its thickness across its entire major surface, or provided in a separate layer on the geotextile sheet or fabric material. In the preferred embodiment, the powdered or granular copolymer is at least partially disposed within the pores of the geotextile fabric or mat material to surround the upper fibers, e.g., by vacuum suction, by vibrating during deposition of the copolymer thereon to allow the powdered or granular copolymer to flow by gravity and vibrational forces into the pores of the geotextile sheet or mat, or simply by virtue of being sized to be received within the pores of the contacting surface of the woven or non-woven (preferably non-woven) geotextile fabric or mat.

In the preferred embodiment, a liquid-impermeable cover sheet (membrane layer) is adhered to the upper major surface of the copolymer-containing geotextile fabric or mat to prevent the powdered or granular copolymer from escaping from the geotextile sheet or mat during transportation and installation, and to provide a primary water-impermeable layer to the article. Optionally, the edges of the copolymer-containing geotextile sheet or mat can be sealed, such as by providing the upper water-impermeable cover sheet slightly larger than the dimensions of the geotextile sheet or mat and gluing or otherwise adhering the extra cover sheet material to the edges of the copolymer-containing geotextile, such as by heat sealing them together. Other edge sealing options include sewing, needlepunching, and ultrasonic welding of the cover sheet to the edge of the geotextile sheet or mat, or by applying a separate, edge-covering material that can be glued, heat sealed or ultrasonically welded to the water-impermeable cover sheet and/or to the geotextile sheet or mat. Edge sealing materials preferably are liquid-impermeable.

In addition to the layer of partially cross-linked acrylamide/partially neutralized acrylic acid copolymer, powdered or granular materials can be admixed with the copolymer or can be applied as a separate layer. The additional powdered or granular materials include water-swellable sodium smectite clay, organophilic clay, activated carbon, coke breeze, zero-valent iron, apatite, zeolite, peat moss, polymeric ion exchange resins, polymeric adsorbents and mixtures thereof. Preferably, the copolymer is disposed adjacent to the water-impermeable sheet or film barrier layer, and also may contain other materials, admixed therewith in an amount up to about 80% by weight of the mixture.

The method of manufacture permits the manufacture of a geocomposite article that includes the partially cross-linked acrylamide/acrylate/acrylic acid copolymer that is structurally secure, without substantial lateral movement, and contains the swelling material either as a discrete layer between the impermeable sheet and the geotextile, uniformly distributed throughout the geotextile, or distributed as a gradient throughout the geocomposite article. The multi-layer geocomposite article can be manufactured to provide either a flexible or a rigid geocomposite article, and permits the manufacture of various modified geocomposite articles that include the salt water barrier swelling copolymer in addition to a zeolite or an organophilic clay with or without a sodium smectite water-absorbent material; the application of layer(s) of liquid-impermeable films or sheets of material over not only one, but over both major surfaces of the geocomposite article to confine the granular or powdered copolymer material in place within the geotextile sheet or mat; the application of solid or liquid adhesive materials or compositions to glue a major undersurface of the barrier layer to the copolymer or to the geotextile sheet material containing the copolymer for complete retention. The materials can be bonded together either mechanically (sewing, needlepunching or gluing), chemically, or physically (i.e., melting, or the like). The structure can be strengthened or reinforced by inserting one or more rigidifying materials into, or onto, the geocomposite article during manufacture, such as a sheet of perforated fiberglass; rope; cardboard; relatively rigid, liquid-permeable corrugated materials, e.g., corrugated cardboard, and the like at some point at or between the top and bottom major surfaces of the geocomposite article to provide various degrees of flexibility or rigidity; the capability of manufacturing the geocomposite articles without the necessity of a consolidation step; and providing various sizes, shapes and weights of geotextiles to achieve the benefits of each.

The copolymers described herein are lightly cross-linked, i.e., have a crosslinking density of less than about 20%, preferably less than about 10%, and most preferably about 0.01% to about 7%. The crosslinking agent most preferably is used in an amount of less than about 7 wt %, and typically about 0.1 wt %, based on the total weight of monomers. Examples of crosslinking polyvinyl monomers include, but are not limited to, di, tri or other multi-functional acrylic, methacrylic, vinyl ether or acrylamido functional compounds that are well known in the art.

The relative amounts of the acrylamide; acrylate; and acrylic acid in the salt water-waterproofing copolymers described herein can vary widely from about 1 mole percent to about 99 mole percent of each in the copolymer. Best results for achieving excellent free swells in high conductivity water are achieved where acrylamide forms about 5% to about 90 mole % of the copolymer, preferably about 15% to about 60 mole %; sodium and/or potassium acrylate forms about 2% to about 50% mole % of the copolymer, preferably about 5% to about 25 mole % of the copolymer; and acrylic acid forms about 2% to about 50% of the copolymer, preferably about 1% to about 10% mole of the copolymer. Other material compositions that give a free swell of greater than about 35 mL/2 grams material in 4.5% sea salt in water are envisioned for this invention. Other monomers can be present in the copolymer including acrylic and methacrylic esters and acids, and substituted acrylamide and methacrylamides provided that the other monomers do not detract from the ability of the copolymer to absorb high conductivity water.

Figure 1:
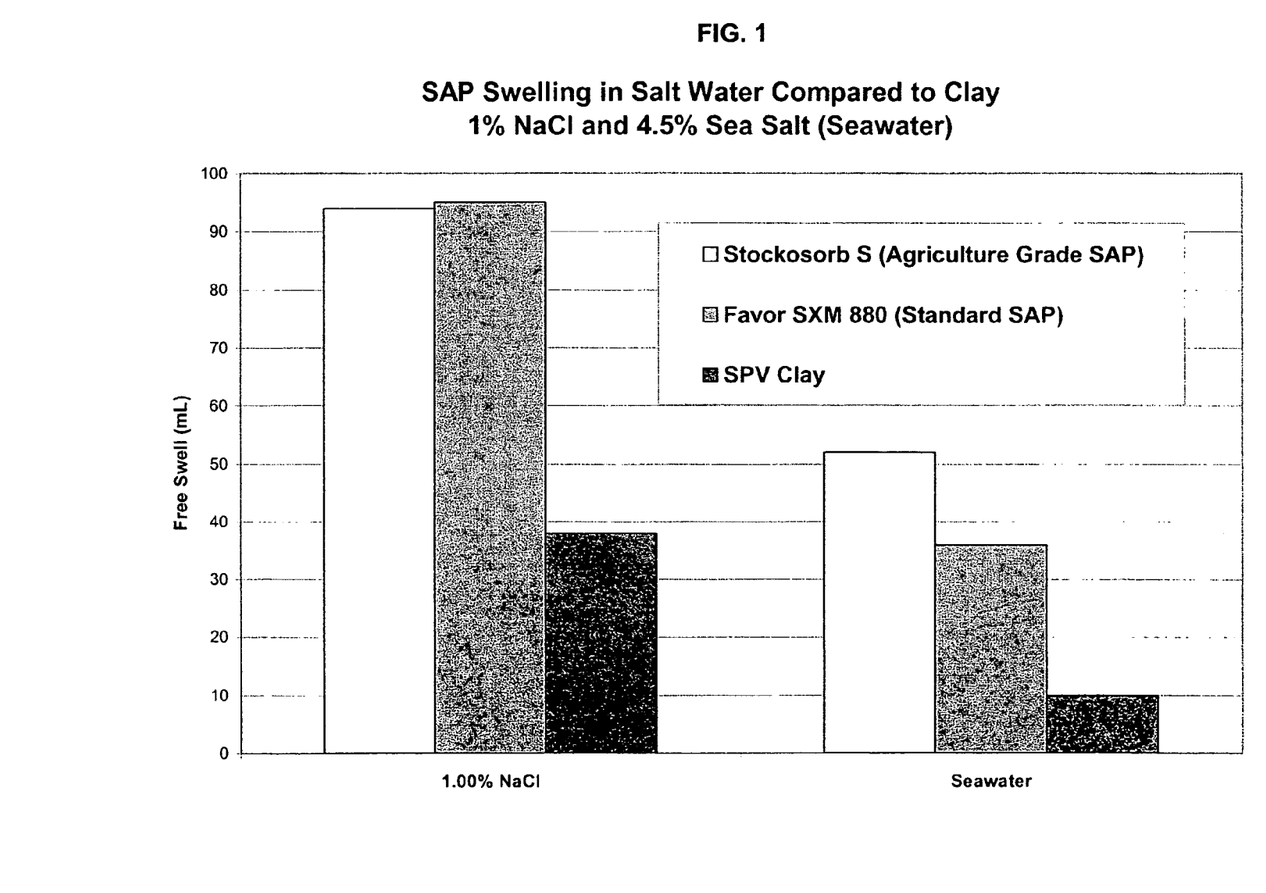
FIG. 1 is a graph showing the free swell volume (2 grams of material in an excess of the aqueous salt solution) of the partially cross-linked acrylamide/acrylate/acrylic acid copolymers in aqueous 1.0% NaCl and 4.5% sea salt compared to a standard, partially cross-linked acrylate/acrylic acid copolymer SAP (Favor SXM 880) and a water swellable sodium bentonite (SPV) clay.
Figures 2, 2B, 2C:
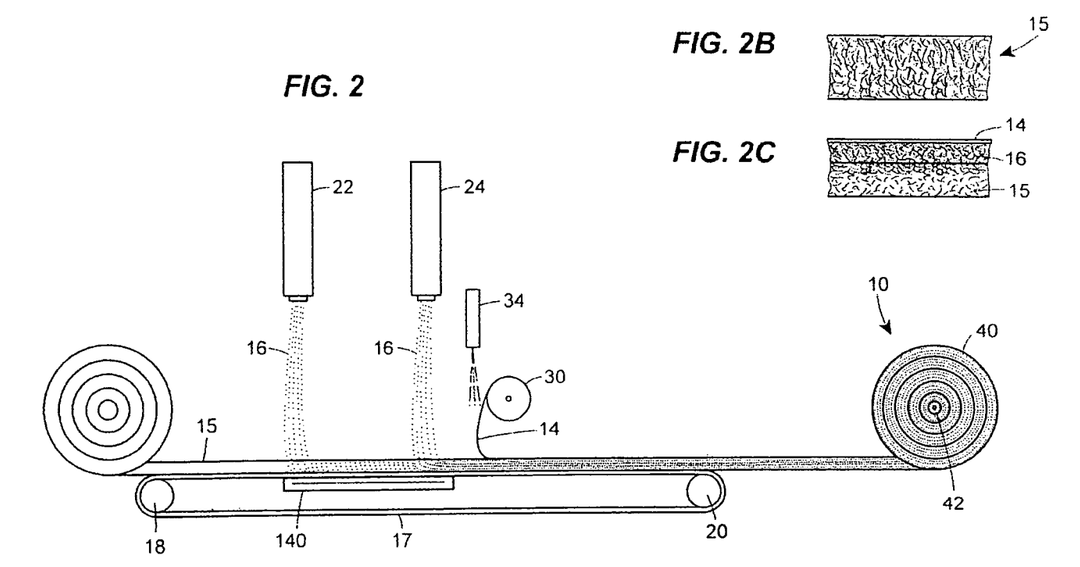
FIGS. 2 and 3 are schematic views of apparatus and methods of manufacture used to make the geocomposite articles useful as salt water barriers in accordance with the present invention.
FIGS. 2A, 2B, and 2C are enlarged partially broken-away side views of various waterproofing geocomposite articles made in accordance with different embodiments of the present invention.
Figure 3:
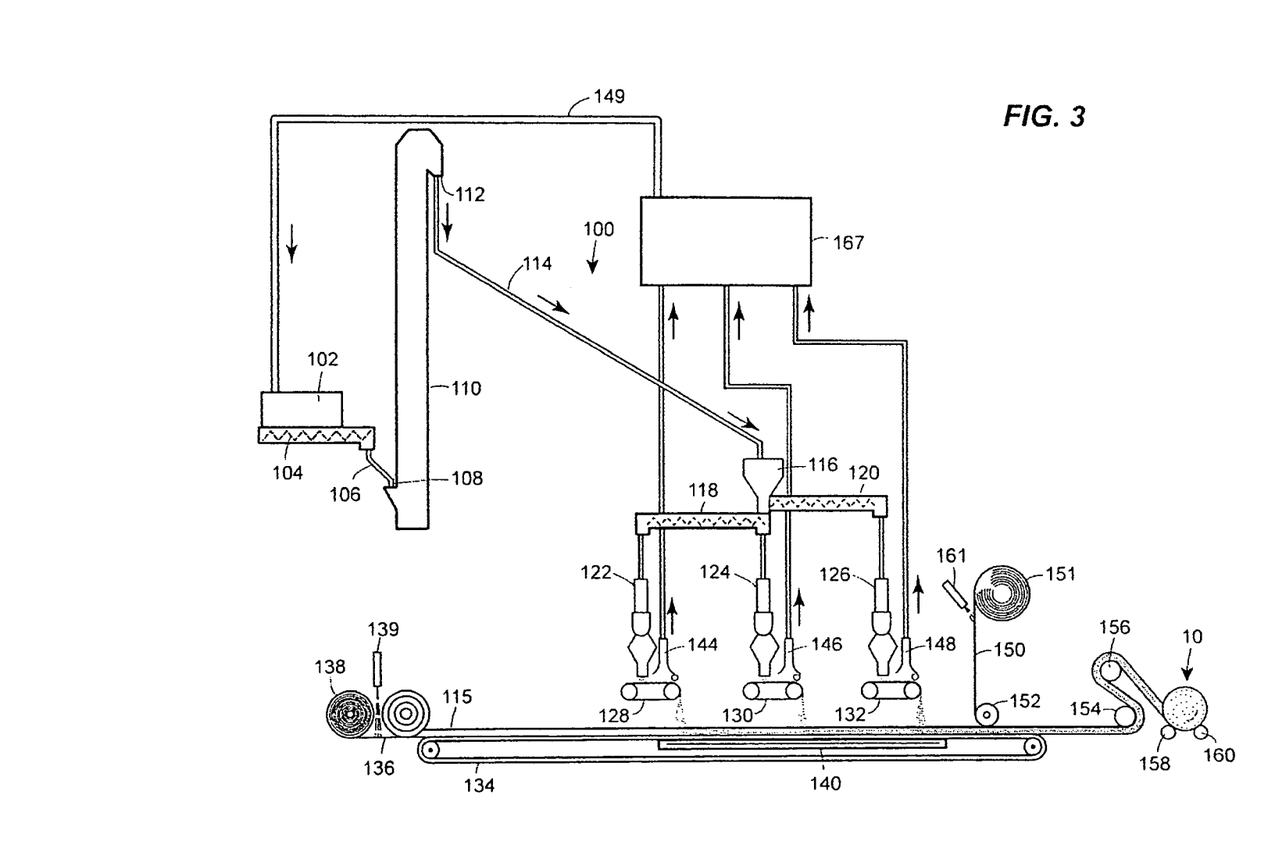
Figure 4:
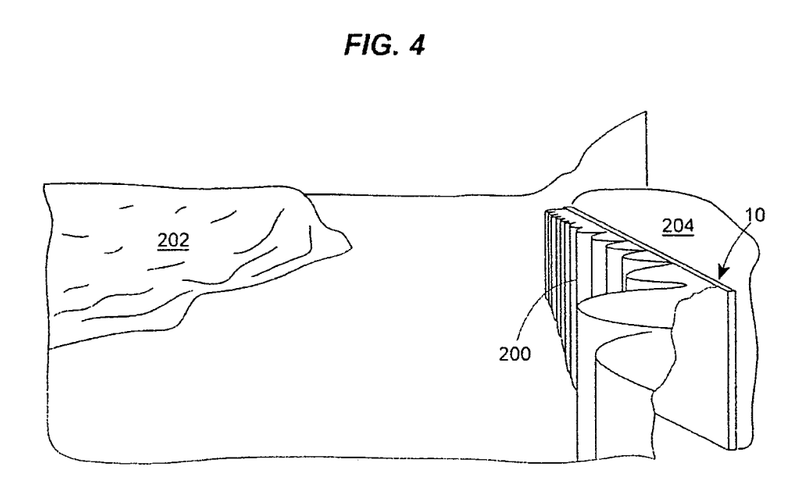
FIG. 4 is a perspective view of a geocomposite article described herein oriented vertically, adjacent to a sea/soil interface.

As shown in FIGS. 2 and 3, there is illustrated a method and apparatus, including a number of optional features each of which can be used alone or in combination with any of the other features for manufacturing a product having only a partially cross-linked acrylamide/acrylate/acrylic acid powdered or granular material therein, or a plurality of different granular or powdered materials, including the copolymer, and with or without various reinforcing materials and/or coating materials added to one or both exterior surfaces of the article being manufactured to provide various characteristics or properties to the finished salt water geocomposite barrier articles 10, as will be described in more detail hereinafter. The apparatus generally includes a conveyor belt 17 that travels continuously around a pair of rollers 18 and 20, at least one of which is motor driven at a desired speed; and one or more powdered or granular material feeding devices, generally designated by reference numerals 22 and 24.

A liquid-impermeable sheet material layer 14, used to provide a primary salt water barrier sheet is applied to an upper major surface of a pre-formed, geotextile sheet or mat 15 after loading the geotextile sheet or mat 15 with the a partially cross-linked acrylamide/acrylate/acrylic acid copolymer 16 from one or both feeding devices 22 and/or 24. In one embodiment, the powdered or granular copolymer 16 penetrates the geotextile sheet or mat 15 by vibrating the geotextile 15 with vibrator 140. Alternatively, vacuum can be applied under the geotextile sheet or mat 15. Alternatively, the copolymer 16 minimally penetrates into an upper surface of the geotextile sheet or mat 15 to form a distinct copolymer layer disposed between the geotextile sheet or mat 15 and the primary waterproofing barrier layer 14.

Additional granular or powdered materials can be applied to the geotextile sheet or mat 15 from feeding conduits 22 or 24 to provide one or more surface concentrations of copolymer 16 or to apply a different powdered or granular material, prior to applying the water-impermeable cover layers 14. The primary barrier layer 14 preferably is adhered to the upper major surface of the copolymer-containing geotextile sheet or mat 15 using a water-insoluble adhesive, applied from adhesive supply vessel 34. Other nonlimiting methods of introduction of the copolymer into the composite structure can be envisioned. Alternative methods could include: the coating or spraying of a paste or dispersion of the copolymer onto the sheet via extrusion or roll coating; preassembling a copolymer/fabric composite to be later combined with a water-impermeable layer to form the final composite; or other methods to achieve the desired structure.

Figure 2A:
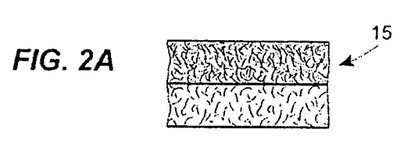

FIG. 2A shows at geotextile sheet or mat 15 filled only on an upper major surface with the powdered or granular copolymer material 16. FIG. 2B shows the geotextile sheet or mat 15 filled with the copolymer 16 incorporated throughout the geotextile sheet or mat 15. FIG. 2C shows the partially embedding of the copolymer 16 into an upper surface of the geotextile (preferably non-woven) sheet or mat 15, a distinct intermediate layer of copolymer, and an adhesively secured upper, primary, water-impermeable sheet material layer 14. Other layers of material could be envisioned to assist in improvement of the mechanical strength of the composite, to assist with the containment of the copolymer in the structure, or improve the bonding of the different layers of the structure.

Turning now to FIG. 3, there is shown a schematic diagram of one method of loading the pre-formed, high loft geotextile mat 115 with powdered or granular copolymer in a dry state. The dry material feeding apparatus, generally designated by reference numeral 100 is useful for depositing the partially cross-linked acrylamide/acrylate/acrylic acid copolymer, with or without other powdered or granular materials, such as an organophillic clay or other materials, from a receiving hopper 102. An auger 104 is disposed at a lower end of the receiving hopper 102, and in fluid communication therewith, to force the copolymer material through conduit 106 to an inlet 108 of elevator 110. The copolymer is discharged from the elevator 110 at elevator outlet opening 112, through conduit 114 into a receiving hopper 116. A pair of augers 118 and 120 in fluid communication with a lower portion of hopper 116 force the copolymer into one, two or three feeding mechanisms, generally designated by reference numerals 122, 124 and 126, for feeding the copolymer in a controlled manner to one, two or three continuous feed conveyor belts 128, 130 and 132 successively aligned above an elongated product conveyor belt 134.

The copolymer generally is applied over the geotextile sheet or mat 115 in an amount of about 0.1 ounce to 3 pounds of powdered or granular copolymer per square foot of finished article major surface area, preferably about 0.1 ounce to about 5 pounds of powdered or granular copolymer per square foot of article major surface area. In accordance with one embodiment, a supply of a liquid-impermeable flexible sheet material 136 in roll form 138 may be disposed above the continuous product conveyor belt 134 to provide a continuous supply of liquid-impermeable flexible sheet material onto an upper surface of the product conveyor belt 134. The upper surface of sheet material 136 from roll 138 may be sprayed with liquid adhesive from adhesive vessel 139 to adhere the sheet material to an undersurface of the geotextile sheet or mat 115, and the powdered or granular copolymer then is deposited onto the geotextile sheet or mat 115 from one, two or all three of the feed conveyor belts 128, 130 and 132. Any one, two or all three of the feed conveyor belts 228, 230 and 232 can be used to incorporate the same or different powdered or granular materials throughout a portion of, or the entire thickness of the geotextile sheet or mat 115. Vibration apparatus 140 may be connected to the product conveyor belt directly below the feed conveyor belts 128, 130, and 132 to vibrate the powdered or granular contaminant-reactant materials into the geotextile sheet or mat 115.

The powdered or granular copolymer is deposited across the entire width of the geotextile sheet or mat 115, as the particles drop from the feeders 122, 124 and/or 126. In this manner, the entire thickness or any portion of the thickness of the fibrous mat 115 may be filled with the copolymer. Dust collection suction devices 144, 146 and 148 may be disposed near each continuous feed conveyor belt 128, 130 and 132 to clear the air of fine particles emanating from feeding mechanisms 122, 124 and 126 and return the particles back to a dust collector 167 for disposal and/or back to the receiving hopper 102, via conduit 149. A second flexible, water-impermeable sheet material 150, from roll 151, is disposed on a downstream side of the copolymer feeding mechanisms 122, 124, and 126 and above the product conveyor belt 134. The second flexible sheet material 150 is fed by power driven roller 152, power rollers 154 and 156 and wind up rollers 158 and 160 to dispose a flexible, water-impermeable sheet material 150 on top of the contaminant-reactant-containing article to dispose the geotextile sheet or mat 115 and the separate, or geotextile-contained copolymer, between lower flexible sheet material 136 between the geotextile sheet or mat 115 and the upper flexible, water-impermeable primary barrier layer 150. Adhesive vessel 161 preferably applies adhesive to a surface of sheet material 150 to adhere the sheet material 150 to an upper surface of the copolymer-containing geotextile sheet or mat 115.

The copolymer functions to absorb high conductivity multivalent ion-containing salt water regardless of its particle size. The powdered or granular copolymer preferably has a particle size in the range of about 10 µm to about 500 µm, preferably about 50 µm to about 1,000 µm, more preferably about 50 µm to about 800 um, and most preferably a particle size distribution of about 50 µm to about 800 µm containing up to 100% of the particles in the 50 µm to 200 µm range, preferably about 10 wt % to about 50 wt % in the 50 µm to 200 µm range, with 50 to 90 wt. % of the particles in the 200 µm to 800 µm size range.

Figure 5A:
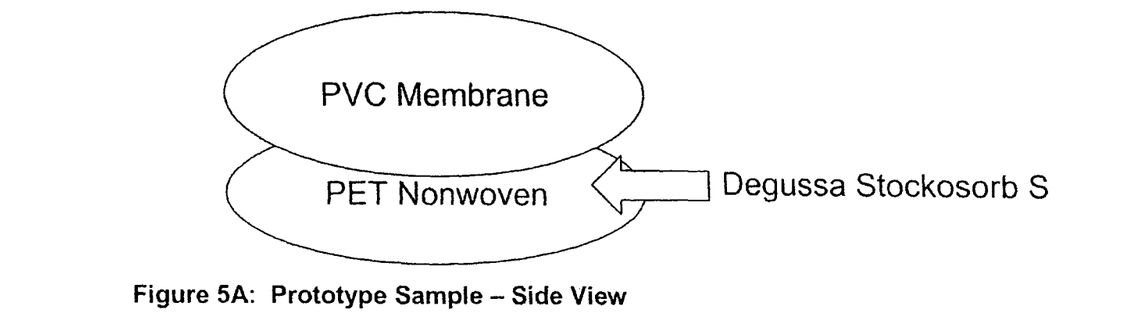
FIGS. 5A and 5B are schematic views of test geocomposite articles with and without 1 inch slits that were tested under four meters of head salt water pressure comparing salt water barrier properties of articles with and without the partially cross-linked acrylamide/acrylate/acrylic acid copolymer, resulting in the data shown in the graphs of FIGS. 6 and 7.
Figure 5B:
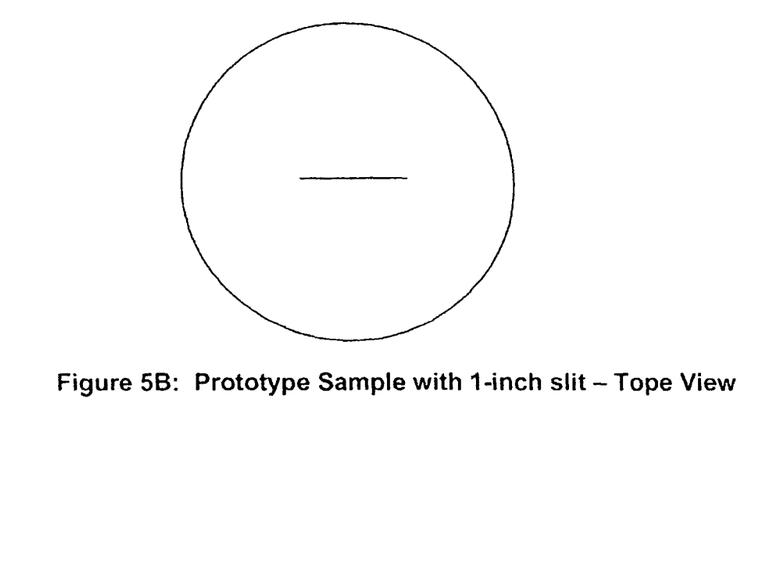

As shown in FIG. 5, the geocomposite articles 10 containing the partially cross-linked acrylamide/acrylate/acrylic acid copolymers described herein are particularly effective for vertical disposition adjacent to a sea/soil interface 200 for protecting the soil interface from salt water penetration by ocean 202 which would otherwise penetrate the sea/soil interface 200 into soil 204.

The geotextile sheet or mat 15 or 115 can be woven or non-woven, preferably non-woven. Suitable fibers of construction of the geotextile mat 15 or 115 include fibers made from rayon, polypropylene, polyesters, nylon, acrylic polymers and copolymers, ceramic fiber, fiberglass, propylene-ethylene copolymers, polypropylene-polyamide copolymers, a single monofilament, polyethylene, polyurethane, cotton, jute and any other non-biodegradable, or very slowly biodegradable, fibers preferably having both bacteriological, hydrolytic and chemical resistance. In some installations, the thickness of the article is not important and such articles can be formed with any desired thickness, e.g., 3 mils to about 4 inches containing about 0.1 oz to about 30 pounds per square foot of contaminant-reactant material.

The above-described products can be modified in a number of ways to suit various purposes and this adaptability of the products is one of the primary benefits when compared with water barriers of the prior art. For example, the geocomposite products described herein can be loaded with a heavy material such as metal screen, or a heavy mineral such as Barite, iron oxide or the like, relatively uniformly, together with the powdered or granular copolymer so that the overall product has a specific gravity greater than 1.0 thereby enabling the material to submerge easily in water. Accordingly, the product can be applied to the soil surface at the bottom of a filled lagoon, waste containment area, and the like, without first draining the lagoon or waste containment area. The product containing a heavy mineral can be rolled out over the water or waste containment upper level and allowed to sink to cover the soil surface at the bottom of the water or liquid waste material, thereby saving substantial time, effort and expense in sealing a pre-existing lagoon, waste containment area, and the like, without first draining the lagoon or waste containment area.

In another embodiment, the products described herein can have incorporated therein a very light material such as expanded vermiculite or expanded perlite, so that the product has substantial buoyancy in water, liquid waste materials, and the like, to form a cover over a liquid waste containment area, such as a toxic waste lagoon, to prevent external compounds, dust, and dirt from entering the waste containment area. One portion of this cover material can be adapted for removal or rolling back so that additional toxic waste and the like may be added to the covered containment area while maintaining a water-impervious cover to prevent further filling of the waste containment area with rain water.

The products described herein can be essentially a single copolymer-containing, non-woven fabric material, adhered to a water-impermeable cover layer, e.g., polyvinyl chloride (PVC) primary barrier sheet. Preferably, the geocomposite article includes an upper barrier layer, such as a polyvinyl chloride (PVC) sheet material adhesively secured to a woven or non-woven sheet material containing the partially cross-linked acrylamide/acrylate/acrylic acid copolymer. Further, drainage structures and other articles used in the water drainage arts can be virtually incorporated into the interior of this product during manufacture, e.g., under the upper cover sheet. Herbicides, bactericidal materials, tracer chemicals, various colorants that indicate contact with a particular chemical or class of chemicals, and the like, also can be incorporated into the articles described herein.

The product is particularly effective in shored wall conditions for application against steel sheet piling; soldier beam and lagging; soldier beam and earth installations; concrete caissons; earthen stabilized wall structures and diaphragm wall structures.

The uses for the powdered or granular material-filled or partially-filled products described herein are virtually infinite since the product can be made completely flexible, relatively rigid or rigid and can be applied against very contoured and slopping surfaces, rough or smooth, as well as vertical surfaces, such as foundation walls, dams, along the sides of canals and below grades such as in tank farms, and for irrigation and water conservation techniques.

In order to demonstrate the "healing" capacity of the partially cross-linked acrylamide/acrylate/acrylic acid copolymers described herein, geocomposite test articles were prepared from a PVC sheet material geomembrane having a thickness of 0.045 inch adhesively secured (using 2.30 grams of Bostik Supertak Aerosol Adhesive) to a non-woven polyethylene terephthalate (PET) fabric material containing 2.96 grams of STOCKOSORB S (partially cross-linked acrylamide/acrylate/acrylic acid copolymer) sandwiched between the geomembrane and the fabric layers. The PVC and PET sheet materials were circular sheets each 10 cm in diameter, having a surface area of 78.54 cm². The geocomposite test articles were cut with a 1 inch slit through all layers, as shown in FIG. 5.

Test Procedure: Self-Healing Performance

Figure 6:
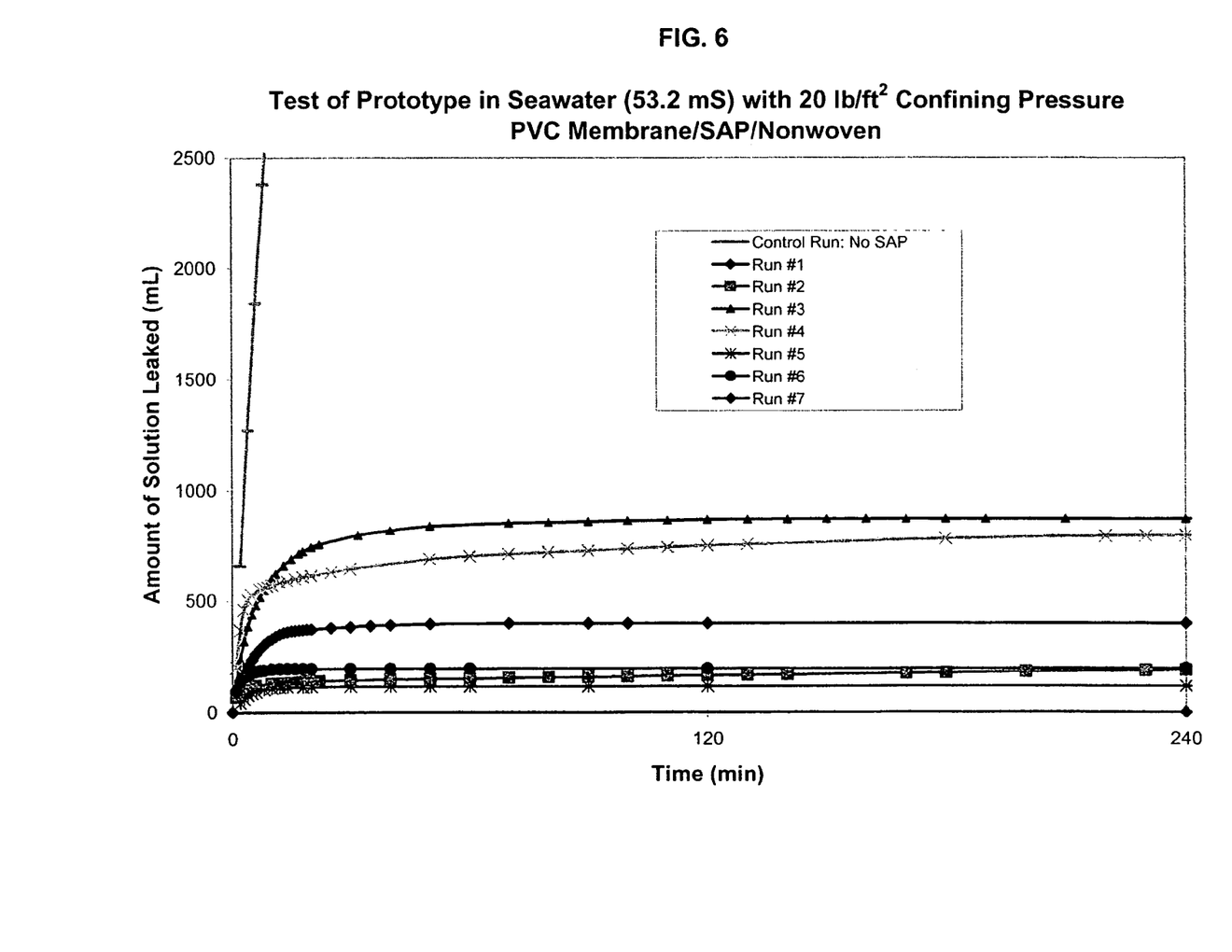
FIGS. 6 and 7 are graphs showing that test geocomposite articles, as described herein, containing a 1 inch slit therethrough, will provide copolymer healing of the slit by the confined copolymer swelling under a 4 meter head of high conductivity salt water.

The geocomposite test articles were cut into 10 cm diameter circles. The test samples were then were cut with a 1-inch slit through all layers, as shown in FIG. 5, to simulate damage to the geomembrane. The slit samples were then placed in a circular test cell, sealed at its edges, at the bottom of a water tower to provide 4 meters of salt water (4.5 wt. % Sea Salt; 53.2 mS/cm Conductivity) head pressure. A porous stone and weight were placed on top of the slit to simulate a confining pressure on the sample of 20 lb/ft² without preventing the access of the sea salt solution to the slit. The test cell is then filled with the test solution exposing the test sample to the saltwater under the specified conditions. The amount of salt water that flows through the slit in the test sample is collected and measured at regular time intervals. Testing is conducted for as long as is practical for samples that exhibit poor self healing and for a minimum of 24 hours for samples that exhibit good self healing. Typical results of the testing are shown in FIG. 6.

Data Analysis

The fluid flow vs. time is plotted for the geocomposite test article sample and the data is evaluated to determine the slope of the curve (flow rate in mL/min) once the fluid flow has reached steady state. The fluid flow of a geocomposite control sample is also measured. The geocomposite control sample consists of the water-impermeable membrane employed with the test sample without an active self healing layer. The test apparatus is evaluated after the test to make sure that test cell failure did not compromise results.

The performance of the test sample is reported as the "self-healing performance index" or "SPI" which is calculated according to the following formula: $SPI = S_T/S_C$, wherein $S_T$=Flow rate of fluid through the slit in the sample (mL/min) after steady state flow has been achieved, wherein $S_C$=the Flow rate through a control sample (mL/min) after steady state flow has been achieved.

To achieve the full advantage of the articles and methods described herein, the articles tested as described above should have an SPI less than 0.1, preferably less than 0.01, more preferably less than 0.015, even more preferably less than 0.005 and most preferably less than 0.001.

woven PET layer, with no copolymer carried by the non-woven, had rapid, linear salt-water leakage of about 139.4 ml/min. The geocomposite articles constructed as described herein, containing the partially cross-linked acrylamide/acrylate/acrylic acid copolymer (Run #1 through Run #7—FIG. 6) that exhibited salt water leakage in the first 20-30 minutes until the copolymer was sufficiently swelled by the salt water and sealed off the PVC slit. After about 30 minutes, there was little to no additional salt water leakage through the slit in the geocomposite article.

Figure 7:
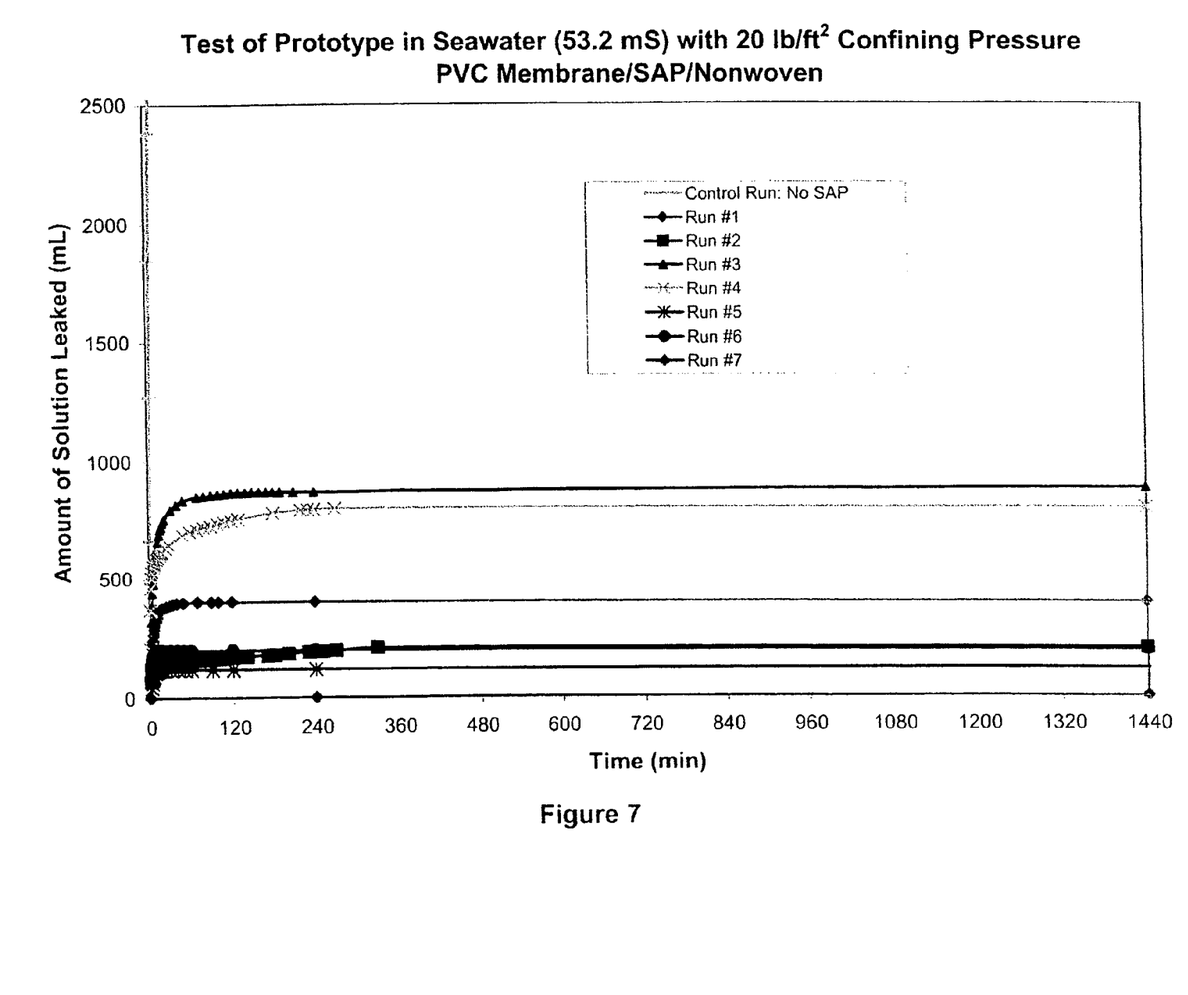

FIG. 7 shows the results of the control of FIG. 6 (PVC plus non-woven without copolymer) and Run #1 through Run #7 over 1440 minutes. The control sample shows continued leakage while the Runs #1-7 show essentially no salt water leakage after 20-30 minutes.

The invention claimed is:

1. A self-healing geocomposite article comprising:
   a) at least one water-impermeable membrane layer;
   b) at least one active self-healing layer comprising a water-insoluble powdered or granular high conductivity water-absorbent copolymer capable of absorbing water having a conductivity of at least 1 mS/cm wherein the copolymer contains about 5-90 mole % acrylamide; about 2-50 mole % sodium or potassium or lithium or ammonium acrylate; and about 2-50 mole % acrylic acid, said copolymer having 50-90 wt. % of particles in the 200 μm to 800 μm size range and about 10 wt. % to about 50 wt. % of particles in the 50 μm to 200 μm size range; and
   c) a woven or non-woven geotextile fabric containing at least a portion of the self-healing layer adhered to the membrane layer to sandwich the active self-healing layer between the membrane and the fabric;
   wherein the geocomposite article exhibits a self-healing performance index less than 0.015 when tested by placing a 1 inch slit through all layers of the geocomposite article sealed at its edges under 4 meters of water with a conductivity of 1 mS/cm or greater.

2. The self-healing geocomposite article of claim 1, wherein the powdered or granular high conductivity water absorbent copolymer is included in the article in an amount in the range of 0.1 ounce to 5 pounds per ft² of a major surface area of the article.

3. The self-healing geocomposite article of claim 2, wherein the active self-healing layer is a partially cross-linked, water-insoluble acrylamide/acrylic acid/acrylate copolymer.

|  | | Test Sample # | | | | | | | | | | | |
|---|---|---|---|---|---|---|---|---|---|---|---|---|---|
|  |  | 15 | 16 | 19 | 20 | 21 | 25 | 26 | 28 | 29 | 30 | 31 | 32 | 33 |
| Core | Control* | Control 2** | PVC | PVC | PVC | PVC | PVC | PVC | PVC | PVC | PVC | PVC | PVC | PVC | PVC |
| Ag SAP g/sq ft | 0 | 0 | 35 | 35 | 35 | 35 | 35 | 35 | 35 | 42 | 42 | 28 | 28 | 28 | 35 |
| Standard SAP | 0 | 35 | 0 | 0 | 0 | 0 | 0 | 0 | 0 | 0 | 0 | 0 | 0 | 0 | 0 |
| Time to Seal (min) | N/A | N/A | 60 | 330 | 40 | 14 | 0 | 355 | 30 | 2 | 60 | 70 | 1 | 16 | 1 |
| Volume to Seal (mL) | N/A | N/A | 401 | 206 | 119 | 198 | 0 | 372 | 60 | 4 | 202 | 241 | 0 | 164 | 0.8 |
| Water Conductivity | 53.2 | 53.2 | 53.2 | 53.2 | 53.2 | 53.2 | 53.2 | 53.2 | 53.2 | 53.2 | 53.2 | 53.2 | 53.2 | 53.2 | 53.2 |
| SS Flow Rate mL/min | 139.4 | 2.32 | 0 | 0.0577 | 0 | 0 | 0 | 0.00750 | 0 | 0 | 0 | 0 | 0 | 0.011 | 0 |
| SPI | N/A | 0.01665 | 0 | $4.135 \times 10^{-4}$ | 0 | 0 | 0 | $5.379 \cdot 10^{-5}$ | 0 | 0 | 0 | 0 | 0 | $7.889 \times 10^{-5}$ | 0 |

*Control: no partially cross-linked acrylamide/acrylate/acrylic acid copolymer (Ag. Grade SAP)
**Control 2: partially cross-linked acrylate/acrylic acid copolymer (conventional SAP) only As seen in FIG. 6, a control test geocomposite article, containing the PVC layer adhesively secured to the non- 4. The self-healing geocomposite article of claim 2, wherein the active self-healing layer is a partially cross-linked, water-insoluble acrylamide/acrylic acid/acrylate copolymer identified by the CAS #31212-13-2.

5. The geocomposite article of claim 4, wherein the copolymer contains about 4-60 mole % acrylamide; about 25-50 mole % sodium or potassium or lithium or ammonium acrylate; and about 5-50 mole % acrylic acid.

6. The geocomposite article of claim 4, wherein the powdered or granular copolymer includes less than 5000 ppm acrylamide monomer.

7. The geocomposite article of claim 6, wherein the powdered or granular copolymer includes less than 1,000 ppm acrylamide monomer.

8. The geocomposite article of claim 7, wherein the powdered or granular copolymer includes less than 100 ppm acrylamide monomer.

9. The self-healing geocomposite article of claim 1 wherein the water absorbent copolymer has a free swell of greater than 35 mL/2 grams material in 4.5% sea salt in water solution.

10. The self-healing geocomposite article of claim 1, wherein the active-self-healing layer comprises a combination of said copolymer together with a second powdered or granular material selected from the group consisting of sodium smectite clay; organophilic clay; activated carbon; coke breeze; zero-valent iron; apatite; zeolite; pete moss; polymeric ion-exchange resin; polymeric adsorbent; and a mixture thereof.

11. The self-healing geocomposite article of claim 10, wherein the second powdered or granular material is included with the copolymer in an amount less than 50 wt. % based on the total weight of the copolymer and the second powdered or granular material.

12. The geocomposite article of claim 1, wherein the geotextile fabric, prior to receiving the powdered or granular copolymer, has an apparent opening size in the range of about 0.5 mm to about 6 mm.

13. The geocomposite article of claim 1, wherein the powdered or granular copolymer comprises about 50% to about 99.9% by volume of the geotextile fabric.

14. The geocomposite article of claim 13, wherein the water contains multivalent ions selected from the group consisting of Na+, Mg++, Ca++, Al++ and combinations thereof.

15. The geocomposite article of claim 13, wherein the geocomposite article further includes a powdered or granular reactive material selected from the group consisting of activated carbon, coke breeze, zero-valent iron, apatite, organophilic clay, zeolite, polymeric ion exchange resins, polymeric adsorbing resins and mixtures thereof.

16. The geocomposite article of claim 13, wherein the geotextile fabric contains fibers selected from the group consisting of polyolefin, polyester, polyamide, and copolymers of any two or more of the foregoing.

17. The geocomposite article of claim 13, wherein the geotextile, prior to receiving the powdered or granular copolymer, has an apparent opening size in the range of about 0.5 mm to about 6 mm.

18. The geocomposite article of claim 13, wherein the powdered or granular copolymer has a particle size such that at least 90% of the particles have a size in the range of about 6 mesh to about 325 mesh.

19. The geocomposite article of claim 13, wherein the geotextile fabric is non-woven.

20. The geocomposite article of claim 1, wherein the geotextile fabric is non-woven.

21. The self-healing geocomposite article of claim 1, wherein the woven or non-woven geotextile fabric comprises one surface adhered to the water-impermeable membrane, and a distinct intermediate layer of said copolymer.

22. A geocomposite article capable of providing a water barrier SPI to water having a conductivity of at least 1 mS/cm comprising:
a geotextile fabric formed from woven or non-woven fibers;
a self-healing layer comprising a powdered or granular partially cross-linked, water-insoluble acrylamide/acrylate/acrylic acid copolymer carried in or on said geotextile fabric wherein the copolymer contains about 5-60 mole % acrylamide; about 25-50 mole % sodium or potassium or lithium or ammonium acrylate; and about 5-50 mole % acrylic acid, said copolymer having 50-90 wt. % of particles in the 200 μm to 800 μm size range and about 10 wt. % to about 50 wt. % of particles in the 50 μm to 200 μm size range; and
a water-impermeable cover sheet adhered to a major surface of the article, adjacent to said copolymer to confine the copolymer within the geocomposite article, as a primary water-impermeable layer;
wherein the geocomposite article exhibits a self-healing performance index less than 0.015 when tested by placing a 1 inch slit through all layers of the geocomposite article sealed at its edges under 4 meters of water with a conductivity of 1 mS/cm or greater.

23. The geocomposite article of claim 22, wherein the powdered or granular reactive material comprises about 50% to about 99.9% by volume of the geotextile fabric.

24. A method of manufacturing a geocomposite article that provides a barrier to water having a conductivity of at least 1 mS/cm comprising:
providing a woven or non-woven geotextile sheet or mat;
contacting the geotextile sheet or mat with a self-healing layer comprising a powdered or granular partially cross-linked, water-insoluble acrylamide/acrylate/acrylic acid copolymer wherein the copolymer contains about 5-90 mole % acrylamide; about 2-50 mole % sodium or potassium or lithium or ammonium acrylate; and about 2-50 mole % acrylic acid, said copolymer having 50-90 wt. % of particles in the 200 μm to 800 μm size range and about 10 wt. % to about 50 wt. % of particles in the 50 μm to 200 μm size range, and causing at least a portion of the powdered or granular copolymer to flow into the geotextile mat to fill at least a portion of the geotextile sheet or mat within openings thereof; and
adhering a liquid-impermeable cover sheet onto a major surface of the geotextile mat adjacent to the copolymer after the mat has received the powdered or granular copolymer;
wherein the geocomposite article exhibits a self-healing performance index less than 0.1 when tested by placing a 1 inch slit through all layers of the geocomposite article sealed at its edges under 4 meters of water with a conductivity of 1 mS/cm or greater.

25. The method of claim 24 further including the step of securing a liquid-impermeable cover sheet to a lower major surface of the geotextile sheet or mat before contacting the geotextile sheet or mat with the powdered or granular copolymer.

26. The method of claim 24, further including the step of covering edges of the pre-formed geotextile mat with a water-impermeable sheet material layer.

27. The method of claim 24, wherein the edges of the geotextile sheet or mat are covered with excess material from the water-impermeable cover sheet.

28. The method of claim 27 wherein the excess material of the cover sheet is secured to cover the edges of the geotextile fabric by adhesively securing the cover sheet over the edges of the geotextile fabric, or heat-sealing the cover sheet surrounding the edges of the geotextile fabric.

29. The method of claim 24, wherein the powdered or granular copolymer is caused to flow into the geotextile fabric by vibrating the geotextile fabric while in contact with the powdered or granular copolymer.

30. The method of claim 24, wherein the powdered or granular copolymer is caused to flow into the geotextile fabric by applying a vacuum to an undersurface of the geotextile fabric to draw the powdered or granular copolymer into the sheet or mat from an upper surface.

31. The method of claim 24 further including the step of providing the water-impermeable cover sheet having a dimension larger than the major surface of the geotextile fabric to provide excess cover material so that the excess cover material extends over an edge surface of the geocomposite article, and securing the excess cover material to the geotextile article to cover the edge surface, thereby reducing or eliminating escape of powdered or granular copolymer through the covered edge surface of the geotextile article.

32. The method of claim 24, including the step of covering all edge surfaces with excess cover material, and securing the excess cover material to the geocomposite article thereby reducing or eliminating escape of powdered or granular copolymer through all edge surfaces of the geotextile article.

33. The method of claim 32, wherein the cover sheet is secured over the edge surface by an expedient selected from the group consisting of adhesively securing, thermal welding techniques, vibrational welding and ultrasonic welding.

34. The method of claim 24, wherein the liquid-impermeable cover sheet is adhered to the major surface of the geotextile mat with a water-insoluble adhesive.

35. A method of water proofing a surface from contact with a water source having a conductivity of at least 1 mS/cm comprising disposing a geocomposite article in contact with the surface, such that the geotextile fabric is in contact with said surface, said geocomposite article comprising:
   a) at least one water-impermeable membrane layer;
   b) at least one active self-healing layer comprising a water-insoluble high conductivity water-absorbent copolymer capable of absorbing water having a conductivity of at least 1 mS/cm wherein the copolymer contains about 5-95 mole % acrylamide; about 5-95 mole % acrylate; and about 5-95 mole % acrylic acid, wherein said copolymer has 50-90 wt. % of particles in the 200 µm to 800 µm size range and about 10 wt. % to about 50 wt. % of particles in the 50 µm to 200 µm size range.

36. A method of water proofing a surface from contact with a water source having a conductivity of at least 1 mS/cm comprising disposing a geocomposite article on said surface, such that the water-impermeable membrane layer first contacts the water source, said geocomposite article comprising said copolymer having about 10 wt. % to about 50 wt. % of particles in the 50 µm to 200 µm size range.

* * * * *